US008262883B2

(12) United States Patent
Müller et al.

(10) Patent No.: US 8,262,883 B2
(45) Date of Patent: Sep. 11, 2012

(54) METHODS AND DEVICES FOR SEPARATING PARTICLES IN A LIQUID FLOW

(75) Inventors: Torsten Müller, Berlin (DE); Thomas Schnelle, Berlin (DE); Rolf Hagedorn, Berlin (DE)

(73) Assignee: PerkinElmer Cellular Technologies Germany, GmbH, Hamburg (DE)

( * ) Notice: Subject to any disclaimer, the term of this patent is extended or adjusted under 35 U.S.C. 154(b) by 1518 days.

(21) Appl. No.: 10/549,886

(22) PCT Filed: Mar. 17, 2004

(86) PCT No.: PCT/EP2004/002774
§ 371 (c)(1), (2), (4) Date: Sep. 13, 2006

(87) PCT Pub. No.: WO2004/082840
PCT Pub. Date: Sep. 30, 2004

(65) Prior Publication Data
US 2006/0289341 A1 Dec. 28, 2006

(30) Foreign Application Priority Data
Mar. 17, 2003 (DE) ................................. 103 11 716

(51) Int. Cl.
*B01D 57/02* (2006.01)

(52) U.S. Cl. ......... 204/547; 204/450; 204/643; 204/600

(58) Field of Classification Search .......... 204/450–458, 204/547, 643
See application file for complete search history.

(56) References Cited

U.S. PATENT DOCUMENTS

| | | | | |
|---|---|---|---|---|
| 5,454,472 | A | 10/1995 | Benecke et al. | |
| 6,492,175 | B1 | 12/2002 | Muller et al. | |
| 6,783,647 | B2 * | 8/2004 | Culbertson et al. | 204/453 |
| 2001/0023825 | A1 * | 9/2001 | Frumin et al. | 204/458 |

FOREIGN PATENT DOCUMENTS

| | | | |
|---|---|---|---|
| DE | 4127405 | A1 | 2/1993 |
| DE | 19500683 | A1 | 6/1996 |

(Continued)

OTHER PUBLICATIONS

Schnelle et al., "Trapping of Viruses in High-Frequency Electric Field Cages", Naturwissenschaften 83 (1996), pp. 172-176.

(Continued)

*Primary Examiner* — Alex Noguerola
*Assistant Examiner* — Gurpreet Kaur
(74) *Attorney, Agent, or Firm* — Caesar, Rivise, Bernstein, Cohen & Pokotilow, Ltd.

(57) ABSTRACT

Methods and devices for the separation of particles (20, 21, 22) in a compartment (30) of a fluidic microsystem (100) are described, in which the movement of a liquid (10) in which particles (20, 21, 22) are suspended with a predetermined direction of flow through the compartment (30), and the generation of a deflecting potential in which at least a part of the particles (20, 21, 22) is moved relative to the liquid in a direction of deflection are envisaged, whereby further at least one focusing potential is generated, so that at least a part of the particles is moved opposite to the direction of deflection relative to the liquid by dielectrophoresis under the effect of high-frequency electrical fields, and guiding of particles with different electrical, magnetic or geometric properties into different flow areas (11, 12) in the liquid takes place.

30 Claims, 4 Drawing Sheets

FOREIGN PATENT DOCUMENTS

| | | | | |
|---|---|---|---|---|
| DE | 19859459 | A1 | | 6/2000 |
| DE | 19952322 | A1 | | 5/2001 |
| DE | 10136275 | C1 | | 12/2002 |
| JP | 2000-61472 | | * | 2/2000 |
| WO | 9810267 | A1 | | 3/1998 |
| WO | 0000292 | A1 | | 1/2000 |
| WO | 0131315 | A1 | | 5/2001 |

OTHER PUBLICATIONS

Pfohl et al., "Mikrofluidik mit komplexen Flussigkeiten", Physik Journal, vol. 2 (2003), pp. 35-40.

Fiedler et al., "Diffusional Electrotitration: Generation of pH Gradients over Arrays of Ultramicroelectrodes Detected by Fluorescence", Analytical Chemistry, vol. 67 (1995), pp. 820-828.

Arnold et al., "Surface Conductance and Other Properties of Latex Particles Measured by Electrorotation", J. Phys. Chem., vol. 91 (1987), pp. 5093-5098.

Gorre-Talini et al., "Sorting of Brownian Particles by the Pulsed Application of an Asymmetric Potential", Physical Review E vol. 56, No. 2 (1997), pp. 2025-2034.

Linke, "Von Damonen und Elektronen", Physikalische Blatter, vol. 56 (2000), pp. 45-47.

Maier et al., "Electrorotation of Colloidal Particles and Cells Depends on Surface Charge", Biophysical Journal, vol. 73, (1997) pp. 1617-1626.

International Search Report for PCT/EP2004/002774.

* cited by examiner (State of the art)

METHODS AND DEVICES FOR SEPARATING PARTICLES IN A LIQUID FLOW

BACKGROUND OF THE INVENTION

The present invention relates to methods for the separation of particles in a fluidic microsystem, especially under the action of electrophoresis, and to fluidic microsystems set up to perform such methods.

The separation of microobjects such as, e.g., particles with a natural or synthetic origin or molecules in fluidic microsystems under the action of electrically or magnetically induced forces is becoming increasingly more significant in biomedical and chemical analytical technology. Two conventional separating principles that differ basically according to the type of electrical separating forces are schematically illustrated in FIGS. 10A, B.

FIG. 10A schematically shows the separation by means of negative dielectrophoresis (see, e.g., DE 198 59 459). Particles with different dielectric properties flow in a fluidic microsystem 100' through a first channel 30'. A field barrier extending transversely over channel 30' is generated with electrode arrangement 40' by subjecting it to high-frequency electrical fields which barrier is permeable or acts in a laterally deflecting manner in cooperation with the flow forces as a function of the dielectric properties of the particles. Particles 22' with a permittivity (or conductivity) that is low in comparison to the medium are deflected into adjacent channel 30A' whereas particles 21' with a higher permittivity (or conductivity) flow further in channel 30'. Since the dielectrophoresis is a function of the particle size (see T. Schnelle et al. in "Naturwissenschaften", vol. 83, 1996, pp. 172-176), a separation of the particles in accordance with their size can take place even given the same dielectric properties. The conventional dielectrophoretic particle separation can have disadvantages as concerns the reliability of the separation, in particular in the case of particles with similar permittivities, and as concerns the complexity of the channel design. The reliability of the separation can be limited, in particular in the separation of biological cells of the same type into different subtypes (e.g., macrophages, T lymphocytes, B lymphocytes).

Another problem that has been solved only in a limited fashion in the conventional dielectrophoretic separation of particles can be given by the occurrence of undesired cell components in biological suspension specimens. Cell components can frequently not be distinguished from complete cells solely by their dielectrophoretic properties. Furthermore, they can result in microsystems in undesired accumulations and channel constrictions and in cloggings strong enough to cause system failure. Finally, undesired cell components can also have a disturbing effect on measurements of cells such as, e.g., on a patch-clamp measurement. There is therefore interest in an improved process for purifying suspension specimens that has a greater reliability than the dielectrophoretic separation of particles.

FIG. 10B illustrates an electrophoretic separation of particles, e.g., molecules in a microstructured channel (see T. Pfohl et al. in "Physik Journal", vol. 2, 2003, pp. 35-40). Electrodes 41', 42', are arranged on the ends of channel 30' formed with alternating broad and narrow sections, which electrodes form an electrophoretic field in channel 30' when subjected to a direct voltage. The drift rate of the molecules in the electrophoretic field is a function of their molecular weight and charge. In the wider sections of channel 30' the drift rate of the larger molecules is less, so that in the course of the separation at first the small molecules and later the large molecules arrive at the end of the separation path. The electrophoretic separation in fluidic microsystems does have the advantage that the use of a separation gel as in macroscopic electrophoresis can be eliminated. However, the principle shown in FIG. 10B has the disadvantage that a separate microsystem with adapted geometric parameters must be provided for each separation task and in particular for each particle type. It is also disadvantageous that the separation takes place in the liquid at rest because this is associated with a great amount of time involved and with additional measures for adaptation to continuous systems.

The above-cited separation principles are also mentioned in WO 98/10267. Charged particles are drawn, e.g., electrophoretically from a specimen into a buffer solution flowing in parallel in the channel of a fluidic microsystem. This technique is limited to specimens with certain properties of the specimen components. Furthermore, it is disadvantageous since the particles can be drawn electrophoretically onto the channel walls, which is undesirable, especially in the case of biological material, e.g., cells.

The electrophoretic deflection of particles is also described in DE 41 27 405. Particles are moved in a resting liquid under the action of electrical traveling waves. When they pass electrophoresis electrodes during the movement, a separation takes place in accordance with the electrical properties of the particles. The same disadvantages result as in above-cited WO 98/10267.

The combining of dielectrophoretic and electrophoretic field effects in the manipulation of particles in fluidic microsystems is also known. According to DE 195 00 683 particles suspended in liquid are held in an electrode arrangement that forms a closed field cage (potential well) when loaded with high-frequency alternating voltages by negative dielectrophoresis. In order to correct variations in position caused by thermal conditions, particles in the field cage are additionally shifted electrophoretically. The electrophoretic shifting takes place within the framework of a control circuit in accordance with the positional variations of the particle, that are determined, e.g., optically. The technology described in DE 195 00 683 is not suitable for particle separation since it constitutes a closed, stationary measuring system. Furthermore, the combination of dielectrophoresis and electrophoresis on the closed field cage is limited to relatively large individual particles. Disadvantages can result during the measuring, e.g., of macromolecules since in their case the action of negative dielectrophoresis is distinctly less than that of electrophoresis, so that an undesired accumulation of macro-molecules on the electrodes can occur. Particle groups cannot be measured with this technique since all particles require their own correction movement. A separation of particles would also be rendered more difficult by a dipole-dipole effect (see T. Schnelle et al. in "Naturwissenschaften", vol. 83, 1996, pp. 172-176), which furthers an aggregation of particles.

DE 198 59 459 also teaches the combination of alternating and direct voltages in fluidic microsystems for the targeted fusion or poration of cells. The action of direct voltage on the fusion or poration is limited in this technique and a particle separation is not provided.

The publication of S. Fiedler et al. in "Anal. Chem.", vol. 67, 1995, pp. 820-828 teaches generating temporary or local pH gradients that can be verified with fluorescent dyes by an optionally pulsed direct voltage control of microelectrodes in aqueous electrolyte solutions.

There is not only an interest in a separation of particle mixtures according to geometric (size, shape) or electrical properties (permittivity, conductivity) for pharmacological, analytical and biotechnological research but also according to other parameters such as, e.g., surface charges or charge-volume ratios. The occurrence of surface charges is described, e.g., by N. Arnold et al. in "J. Phys. Chem.", vol. 91, 1987, pp. 5093-5098; L. Gorre-Talini et al. in "Phys. Rev. E" vol. 56, 1997, pp. 2025-2034; and Maier et al. in "Biophysical J." vol. 73, 1997, pp. 1617-1626.

The object of the invention is to provide improved methods for the separation of particles in liquid flows in fluidic microsystems with which the disadvantages of conventional techniques are avoided. Methods in accordance with the invention should be characterized in particular by an expanded area of application for a plurality of different particles and by increased reliability in particle separation. The object of the invention is also to provide improved microsystems for the implementation of such processes, in particular improved microfluidic separating devices characterized by a simplified construction, great reliability, simplified control and a broad area of application for different types of particles.

SUMMARY OF THE INVENTION

The present invention is based as concerns its methods and devices on the general technical teaching of shifting at least one particle suspended in a liquid by a combined exertion of separating forces comprising on the one hand focusing dielectrophoretic separating forces and on the other hand deflecting separating forces such as, e.g., electrophoretic separating forces in a state of a continuous flux within the liquid, that is, relative to the flowing liquid. The at least one particle can be guided in into a certain flow range during its passage past at least one separating device in the fluidic microsystem in accordance with its geometric, electrical, magnetic properties or properties derived from them. Depending on the alignment of the deflecting separating forces (direction of deflection) relative to the direction of movement of the liquid (direction of flow), the flow range can comprise a certain flow path within the cross section of the flow of the liquid or can comprise a flow section that is in the front or in the back in the direction of flow.

The movement of the particle into a certain flow range makes a separation of particle mixtures possible during the continuous flow of the particle suspension, e.g., through a group of several electrodes. The separating effect is based on the specific reaction of different particles to the different deflecting and focusing field effects. In contrast to the separation on field barriers, a separating path can be traversed, which can increase the reliability of the targeted movement of individual particles, e.g., onto certain, preferably two flow paths. The effect of the electrical fields can be coordinated by adjusting the field properties (especially frequency, voltage amplitudes, cycle, etc.) to the parameters of the particles to be separated. The invention makes possible a simplified construction of the electrophoretic separating device since no gels for embedding electrophoresis electrodes or any special channel shapes are required. Furthermore, a formation of gas can be avoided by suitably controlling the electrodes in combination with the permanent flow. Furthermore, the invention has advantages, especially with regard to the reliability and separating sharpness in the separation of particles into different flow paths and has a high degree of effectiveness and a high throughput of the separation.

According to the invention a separation of particles in a compartment, especially a channel of a fluidic microsystem, through which particles flow in a suspended state, whereby at least a part of the particles or particles of at least one type are moved under the effect of a deflecting potential out of the specimen to be separated in a predetermined direction of deflection (first reference direction, e.g., to the edge of the compartment) is further developed in such a manner that an opposite movement of the particles (second reference direction, e.g., away from the walls or as a collection in the middle of the channel) takes place simultaneously or temporarily and/or in a spatially alternating manner under the effect of an opposite potential by means of dielectrophoresis, especially negative or positive dielectrophoresis. Particles with different electrical, magnetic or geometrical properties advantageously experience the effects of potential as separating forces in different ways so that different effective forces (potential minima) form as a result of the combined exertion of potentials, to which the particles migrate. The potential minima are, e.g., spaced in the cross section of flow of the liquid so that a separation in the flow onto different flow paths is possible. The focusing, dielectrophoretically acting potential is preferably formed in such a manner that it acts towards the channel middle. If the electrodes are arranged substantially in a circular line in the channel cross section the focusing potential can advantageously be formed in a radially symmetrical manner relative to the direction of flow.

The particles preferably separated from each other with the technology in accordance with the invention generally comprise colloidal or individual particles with a diameter of, e.g., 1 nm to 100 μm. Synthetic particles (e.g., latex beads, superparamagnetic particles, vesicles), biological particles (e.g., cell groups, cell components, cellular fragments, organelles, viruses) and/or hybrid particles constructed from synthetic and biological, different synthetic or different biological particles can be subjected to the separating processes of the invention.

The electrophoretic mobility $\mu(v=\mu \cdot E)$ for cells is advantageously a function not only of the composition of the external medium, that is, of the suspension liquid (especially conductivity, ion composition, e.g., $Ca^{2+}$ content and pH value) but also of the cell type, so that different cell types within a cell group or different subtypes within a cell group of the same cell types (e.g., macrophages, T lymphocytes, B lymphocytes) can be distinguished with the technique of the invention. The distinguishing of the subtypes represents a special advantage of the invention since they can be distinguished only poorly with conventional dielectrophoretic separation processes. The sharpness of separation, especially for cells of the same type, is increased by the combination of a dielectrophoretic focusing in accordance with the invention.

If the particles to be separated comprise a mixture of biological cells and cell components such as, e.g., cell fragments, the separation process can be advantageously used for purifying a suspension specimen with suspended biological material. The material, that is inhomogeneously composed, e.g., after a cultivation and comprises, e.g., complete cells, dead cells, live cells or fragments of cells such as, e.g., organelles, cellular remnants or protein clumps, can be purified with the process of the invention. The undesired cell fragments can be removed from the microsystem via certain flow paths. A disadvantageous influence on following structural elements in the microsystem such as, e.g., a clogging of channels by cell components can be avoided.

The deflecting potential can advantageously be generated by electrical, magnetic, optical, thermal and/or mechanical forces and thus be adapted to very different applications and particle types. Mechanical forces comprise, e.g., forces transmitted by sound, additional flows or mass inertia. The deflecting potential can be created in particular by a gravitational field whereby according to the invention the movement of the particles and the focusing potential (through high-frequency electrical fields) is superposed by a sedimentation movement of the particles.

If, in accordance with a preferred embodiment of the invention, the deflecting separation forces comprise electrical forces under whose action the particles are drawn by electrophoresis out of the liquid to its edge, this can result in advantages for the result of separation. The combination of electrophoresis and dielectrophoresis for particle separation can have advantages in particular in the separation of biological materials that react very differently to electrophoresis and dielectrophoresis, e.g., as a function of the material or particle size, and therefore can be separated with a high degree of sharpness of separation.

The direct voltage fields for the electrophoretic particle movement in accordance with another embodiment of the invention can be advantageously and additionally used for an electrical treatment of the particles. It is known that biological cells can be lysed in static electrical fields. The lysis comprises an electrically induced change, e.g., destruction of the cells. The lysis serves, e.g., to prepare cellular material for PCR processes. Since the action of the lysis is heavily dependent on the field strength, an especially preferred embodiment of the invention provides that certain cells are deflected from a cell mixture by electrophoresis into a flow area close to the electrodes where the field strength is greater on account of the lesser interval from the electrodes and therefore the lysis takes place at the same time as the process of particle separation.

Furthermore, the sharpness of separation can be flexibly adjusted by a suitable alternating voltage control. The dielectric potential can be shaped in different manners by altering the phase position of fields, given negative dielectrophoresis. In addition, pH profiles can be imposed by regulating the direct voltage which influence the electrophoretically or dielectrophoretically active potential.

In the combination in accordance with the invention of electrophoresis and dielectrophoresis the separation devices for generating the opposite potentials can advantageously be formed by a common unit. The separation device comprises electrodes arranged on the channel walls and loaded by electrical fields for generating the dielectrophoresis and the electrophoresis. Advantages for the control of the separation can result in particular if the electrical fields comprise high-frequency alternating voltage components and direct voltage components that are produced simultaneously or alternately.

According to a modified variant of the invention the deflecting separation forces can comprise electrical forces that are generated like the focusing potential by high-frequency electrical fields. The deflection can therefore likewise be produced by suitably formed dielectrophoretic forces in that high-frequency electrical signals, e.g., sinusoidal signals or square-wave signals are superposed by suitable frequency components.

According to a preferred embodiment of the invention the deflecting and focusing potentials can be formed alternating in time in at least one channel section. In the time average effectively one potential corresponding to the superpositioning of both potentials acts on the particles. This can advantageously simplify the control of the at least one separation device.

According to another preferred embodiment of the invention the two potentials can be alternately generated in different successive sections of the channel. This can advantageously simplify the design of the microsystem.

It can be particularly advantageous for obtaining the separation result if the flow paths empty into other separated compartments of the microsystem. When the separated fractions have flowed into the subsequent compartments a subsequent thorough mixing is excluded. This separation of the fractions can be particularly effective if the compartments are separated from each other by channel walls or by electrical field barriers.

Another embodiment of the invention can provide that another separation in accordance with the principle of the invention, e.g., a combined using of electrophoretic and dielectrophoretic field effects takes place in the compartments. This can achieve advantageous hierarchal separation principles with a separation into coarse fractions and subsequently into fine fractions. However, the sequence of several separating events in the manner of a cascade into different fractions is not obligatory bound to the making available of the separate compartments. On the contrary, the realizing of the separation cascade with flow paths in a common, sufficiently wide channel of the microsystem is possible.

According to a variation of the invention the flow in the microsystem can be guided in such a manner that particles multiply run through a separation stage so that the separation result can be improved even more in an advantageous manner.

Other advantages of the invention can result if after the separation (deflection into different flow areas) a detection takes place in the flow areas for checking the separation result. The detection comprises, e.g., a known optical measurement (fluorescence measuring or transmitted-light measuring) or a known impedance measurement.

The control parameters of the deflecting and focusing potentials can be advantageously adjusted in such a manner as a function of the measured result, e.g., as a function of the separation quality or of occurring erroneous separations that the action of separation is improved.

The effectiveness of the separation of the invention can be advantageously increased if the particles first pass a dielectrophoretic or hydrodynamic arranging element. Individual particles or a group of particles are arranged on this element on a certain flow path on which they pass by the separation devices, e.g., the electrodes for performing the dielectrophoresis and the electrophoresis.

If, according to another variant of the invention, a pH gradient is produced in the channel of the microsystem in which the particle separation takes place, this can result in advantages for the action of separation. The effect of the deflecting potential such as, e.g., the electrophoretic cell particle movement becomes site-dependent by the pH gradient. This makes possible a particle deflection into different flow paths as a function of the particle position along the direction of flow through the channel. An especially simple design of the microsystem results in an advantageous manner if the pH gradient is produced electrochemically using the electrodes that also are used to form the direct voltage field for the electrophoresis.

Another advantage of the invention is that the particle separation can take place simultaneously in several spatial directions. According to the invention several deflecting potentials with different acting directions can be produced with the focusing potential that is then preferably formed acting towards the middle of the channel in order to separate the particles to be separated simultaneously relative to different features such as, e.g., electrical and magnetic properties.

Further subject matter of the invention is constituted by a fluidic microsystem arranged to carry out the methods of the invention and comprising in particular at least one separation device for exerting focusing dielectrophoretic separating forces and deflecting separating forces. A fluidic microsystem with at least one compartment, e.g., a channel for receiving a flowing liquid with suspended particles and with a first separation device for generating a deflecting potential that draws the particles into the first reference direction, e.g., from the middle of the flow, is provided in particular with a second separation device arranged in such a manner as to generate at least one focusing, opposite potential. Under the effect of high-frequency electrical fields the particles are repulsed with the second separation device by dielectrophoresis from the side walls of the channel and/or from electrodes arranged on them or from other parts of separation devices.

According to a preferred embodiment of the invention the first separation device is arranged for generating electrical, magnetic, optical and/or mechanical forces. It comprises, e.g., an electrode device with electrodes or electrode sections and forms a common deflection unit in this instance with the second separation device. Alternatively, the first separation device comprises a magnetic field device, a laser or an ultrasound source. These components are combined for the first time in accordance with the invention for the separation of flowing particles with a dielectrophoretic manipulation.

If the separation devices form a common deflection unit, a simplified design of the microsystems results in an advantageous manner. The deflection unit preferably comprises electrodes constructed like known microelectrodes in fluidic microsystems. The electrodes can be controlled in a manner alternating in time.

The electrodes for the combined dielectrophoresis and electrophoresis are preferably arranged on inner sides of the walls of the compartment. Advantages can result in this design regarding the effectiveness of the field effect.

Since the separation devices can act at the same time or alternating in time and/or in space so that particles are guided according to the effective potentials acting in the time means onto different flow paths, it is advantageously possible that the first and the second separation devices are arranged separately in different successive sections of the compartment. The separation devices comprise, e.g., electrode sections that can be controlled for dielectrophoresis or dielectrophoresis.

BRIEF DESCRIPTION OF SEVERAL VIEWS OF THE DRAWINGS

Other details and advantages of the invention are described in the following with reference made to the attached drawings.

DETAILED DESCRIPTION OF THE PREFERRED EMBODIMENTS

The invention is described in the following with reference made to the separation of particles in the channel of a fluidic microsystem. Fluidic Microsystems are known and are therefore not described with more details. The implementation of the invention is not limited to the channel structures illustrated, e.g., in chip structures or in hollow fibers but can also be realized in general in differently shaped compartments.

The combination in accordance with the invention of focusing and deflecting forces, whose superpositioning results for the particles to be separated in accordance with particle properties in different equilibrium states (flow paths or flow sections) in the liquid flow, with two separating devices or one separation device acting in a combined manner is described with reference made to the preferred exemplary embodiment of a combination of dielectrophoresis and electrophoresis. If the deflecting force has at least one vector component in a reference direction (deflection direction) vertical to the direction of the movement of the liquid in the channel, the dielectrophoresis acts from the walls of the channel into the interior of the cross section of flow of the flowing liquid in a focusing manner while the electrophoresis acts guiding in the inverse manner toward the outer wall of the flow profile, especially toward electrodes on the walls. Other deflecting forces can be used in analogy with the principles explained in the following. On the other hand, if the deflecting force runs parallel to the direction of the liquid flow the dielectrophoresis acts in a focusing manner along the liquid flow whereby the particles in the electrophoretic field are moved at different speeds by a modulation of the dielectrophoretic action.

Figure 1:
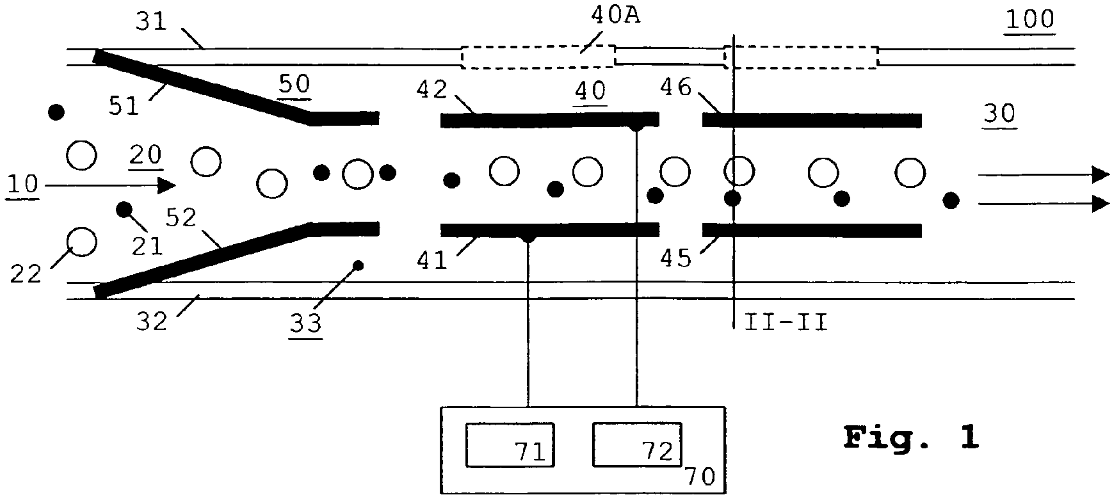
FIG. 1 shows a schematic top view onto a first embodiment of a microsystem (section) in accordance with the invention.
Figure 2:
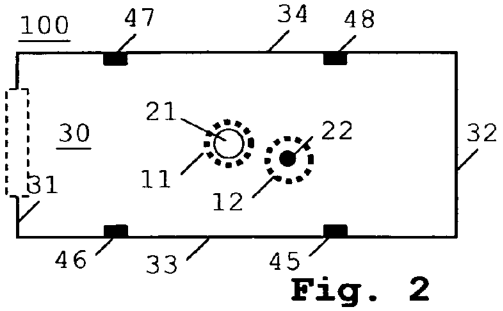
FIG. 2 shows a cross-sectional view of the microsystem in accordance with FIG. 1 along line II-II.

FIGS. 1 and 2 show sections of fluidic microsystem 100 in accordance with the invention in an enlarged schematic top view and a cross-sectional view. Microsystem 100 comprises a channel 30 delimited by lateral channel walls 31, 32, channel bottom 33 (top view in FIG. 1) and cover area 34. Electrodes 40 are formed on channel bottom 33 and cover area 34 as a separation device. Furthermore, funnel electrodes 51, 52 of a dielectric arranging element 50 are provided. The design of microsystem 100 and the formation of the electrodes as well as their electrical connection are known from microsystem technology. The channel has a width, e.g., of around 400 μm and a height of around 40 μm (these ratios are not represented to scale in the figures). The lateral electrode interval in the planes of channel bottom 33 and cover area 34 is, e.g., 70 μm whereas the vertical interval of the electrodes opposing each other is around 40 μm in accordance with the channel height.

Electrodes 40 comprise straight electrode strips extending in the longitudinal direction of channel 30, that is, in the direction of flow through the channel. Electrodes 40 are subdivided into individual electrode segments 41, 42, . . . . Each group of electrode segments forms an electrode section that can be separately controlled. Each segment has a width of around 50 μm and a length of, e.g., 1000 μm in the direction of flow. Each electrode section is connected to a control device 70 (shown here only for electrodes 41, 42).

Control device 70 is arranged in such a manner for loading electrodes 40 with voltages that the particles flowing by are exposed in one electrode section (e.g., 45-48, see FIG. 2) to a repulsion from the electrodes by negative dielectrophoresis and/or an electrophoretic drift movement vertically to the direction of flow. The control device comprises alternating voltage generator 71 and/or direct voltage generator 72 that is/are connected to the electrodes. The alternating voltage generator 71 can be provided with an adjusting device with which the amplitudes of high-frequency alternating voltages on the electrodes can be adjusted.

In order to carry out the method in accordance with the invention, suspension liquid 10 (carrier liquid) flows with particles 20 through channel 30. The flow rate of suspension liquid 10, that can be adjusted with an injection pump, is, e.g., 300 μm/s. An alignment of particles 20 with dielectrical arranged sequence element 50 preferably takes place at first. Funnel electrodes 51, 52 are operated, e.g., with a high-frequency alternating voltage (f=2 MHz, U=20 $V_{pp}$) in order to focus particles 20 on flow path 11 in the middle of channel 30. Alternatively, a hydrodynamic arranged sequence element can be provided in which particles 20 are focused with additional sheat flows.

After the alignment of the particles they pass into the range of electrodes 40. These electrodes are controlled, e.g., in an alternating manner with an alternating voltage and a direct voltage with a clock frequency in a range of 1 to 10 Hz (alternating voltage: f=2.5 MHz, U=20 $V_{pp}$, direct voltage: U=50 V, time t=80 μs). The smaller particles can be drawn within a few seconds by a few 10 μm out of original flow path 11 into adjacent flow path 12 (see FIG. 2) by adjusting the voltage- and frequency parameters of the high-frequency alternating voltage to the flow rate and setting the direct voltage parameters (impulse time, voltage and clock frequency), whereas the coarser particles remain in original flow path 11.

Figure 3:
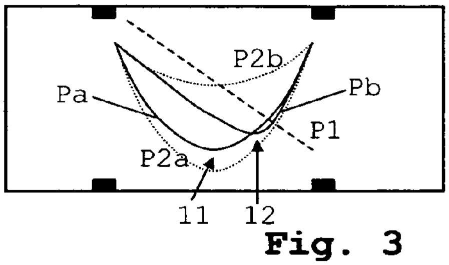
FIG. 3 shows a cross-sectional view of the microsystem with schematically illustrated potential conditions.

The potentials acting on the particles are schematically illustrated in FIG. 3. A direct voltage field is generated for the electrophoresis that generates a potential P1 falling transversely to the cross section of flow. Particles in potential P1 experience an outwardly directed force (deflecting potential, direction of deflection transversely to the direction of flow). The high-frequency control of the electrodes generates an opposite, inwardly directed, focusing potential course P2*a* or P2*b*. The negative dielectrophoresis is based on a particle polarization that has a stronger effect on the large particles then on the small particles. Therefore, in the high-frequency field large particles 21 experience potential P2*a* and small particles 22 the flatter potential P2*b*. The superpositioning of the two instances with focusing potential P1 results in effective potentials Pa, Pb in accordance with the solid lines. Whereas deep potential P2*a* is hardly changed by the electrophoresis, a shifting of the potential minimum out of the channel middle toward the outside results for flat potential P2*b*. The dielectrophoretic, focusing forces are so great for the large particles that they compensate the electrophoretic deflection whereas this is not the case for small particles 21. Separate flow paths 11, 12 are formed in a corresponding manner. Different flow rates can be present in flow paths 11, 12. Given a laminar flow in the channel, the flow rate in the vicinity of the channel wall is, e.g., less than in the middle of the channel. According to the invention particles with different properties can therefore be focused in areas with different flow rates, which can improve the separation sharpness.

Analogous effects result in the case of particles with different relative permittivities or with different net charges, e.g., surface charges.

The separation was demonstrated experimentally with a mixture of particles 20 comprising smaller particles 21 with a diameter of 1 μm ("fluospheres"-sulfate microspheres, Molecular Probes) and larger particles 22 with a diameter of 4.5 μm (polybead polystyrene, 17135, Polysciences). Cytocon solution I (Evotec Technologies GmbH, Hamburg, Germany) was used as suspension liquid. Since the negative dielectrophoresis has a significantly weaker effect on the small particles than on the large particles, the small particles can be drawn out of middle flow path 11 by the electrophoretic force.

The electrode control takes place, e.g., in accordance with the following scheme:

| Electrodes in FIG. 2 | High-frequency voltage phase | Potential direct voltage |
|---|---|---|
| 47 | 0° | Mass |
| 48 | 180° | Pulse |
| 45 | 0° | Pulse |
| 46 | 180° | Mass |

Alternatively, the electrode control can take place, e.g., in accordance with the following scheme (rotating electrical field):

| Electrodes in FIG. 2 | High-frequency voltage phase | Potential direct voltage |
|---|---|---|
| 47 | 0° | Mass |
| 48 | 90° | Pulse |
| 45 | 270° | Pulse |
| 46 | 180° | Mass |

In order to illustrate the combination of the invention of dielectrophoresis with other deflecting forces, FIG. 1 schematically shows separation device 40A (shown in dotted lines). Separation device 40A provided in or outside of the channel wall is, e.g., a magnetic device for exerting magnetic forces, a laser device for exerting optical forces analogously to the principle of a laser tweezer or a sound source for exerting mechanical forces, e.g., by ultrasound.

Figure 4:
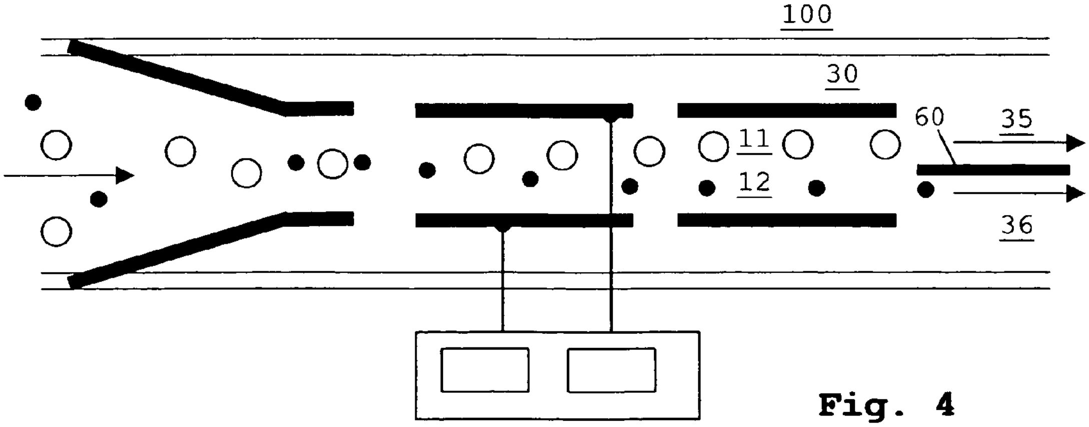
FIGS. 4 to 7 show schematic top views onto other embodiments of Microsystems (section) in accordance with the invention.

FIG. 4 shows features of modified embodiments of the invention. It can be provided, in distinction to FIG. 1, that even flow path 11 is shifted from the middle of channel 30 to the outside, in which the potential minimum of the dielectrophoresis is shifted by an appropriate asymmetrical control of electrodes 40. Furthermore, it can be provided that flow paths 11, 12 empty into separate compartments 35, 36 of channel 30 separated from one another by channel walls or (as illustrated) by an electrical field barrier. The electrical field barrier is generated by at least one barrier on electrode 60 extending in the direction of the channel.

Figure 5:
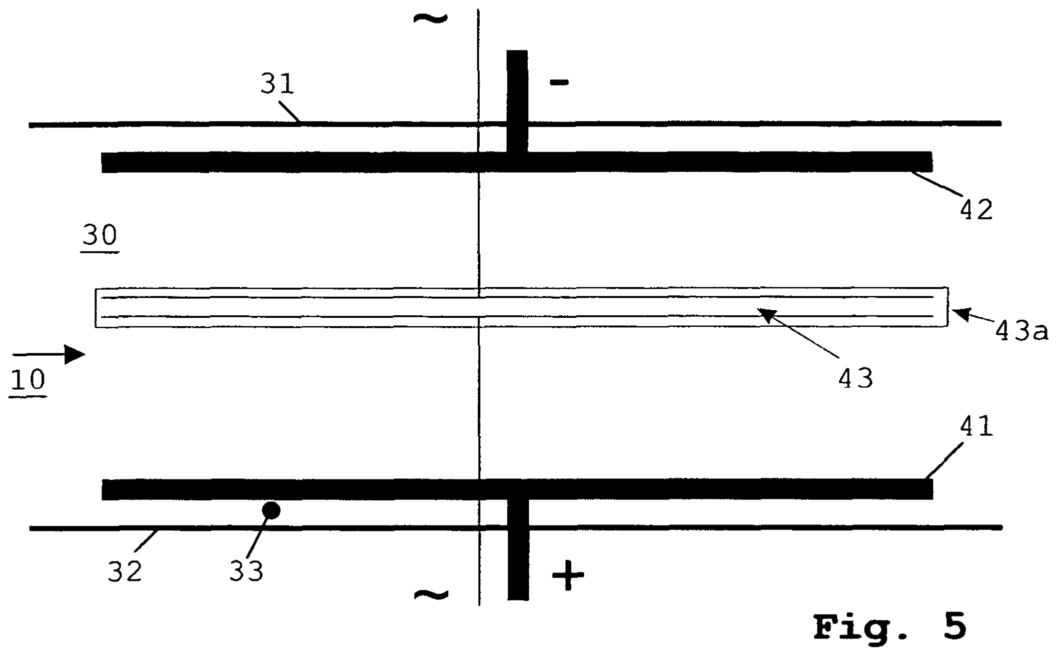

In the embodiment illustrated in FIG. 5 electrodes 41, 42 for the electrophoresis and centrally at least one electrode 43 for the dielectrophoresis are located in channel 30 laterally on channel walls 31, 32 and/or on bottom surface 33. Electrode 43 is provided in a known manner with an electrically insulating passivation layer 43*a*. Passivation layer 43*a* has two functions. Firstly, it prevents a field loss of the direct current field for the electrophoresis and secondly it prevents a permanent accumulation and any associated denaturing of particles or electrochemical reactions on the electrodes. Electrodes 41, 42 and 43 are each connected to a direct voltage source and to an alternating voltage source.

The channel edge can optionally be realized by porous materials (e.g., hollow fibers). This makes it possible to impose additional external chemical gradients (e.g., a pH profile). Furthermore, the at least one electrode 43 and electrodes 41, 42 for the electrophoresis can be arranged staggered in the direction of flow.

For the particle separation washed-in microobjects (e.g., macromolecules) are drawn by positive dielectrophoresis to central electrode 43. Simultaneously or, given alternating control of the electrodes, the microobjects are drawn by electrophoresis to the edge of channel 30. The separation is based on the above-described principles of a differently strong effect of the combination of dielectrophoresis and electrophoresis on the different particles.

Alternatively, the following procedure can be realized with the arrangement according to FIG. 5. The particles are first collected by dielectrophoresis on central electrode 43. Lateral flow 10 through channel 30 is subsequently stopped and a separation of the microobjects carried out via electrophoresis. After the electrophoretic separation into different flow paths flow 10 is continued. The significant advantage of the interruption of the flow transport through the channel optionally provided during the electrophoresis is that an increased sharpness of separation of the electrophoresis can be achieved by the previously defined start conditions.

Figure 6:
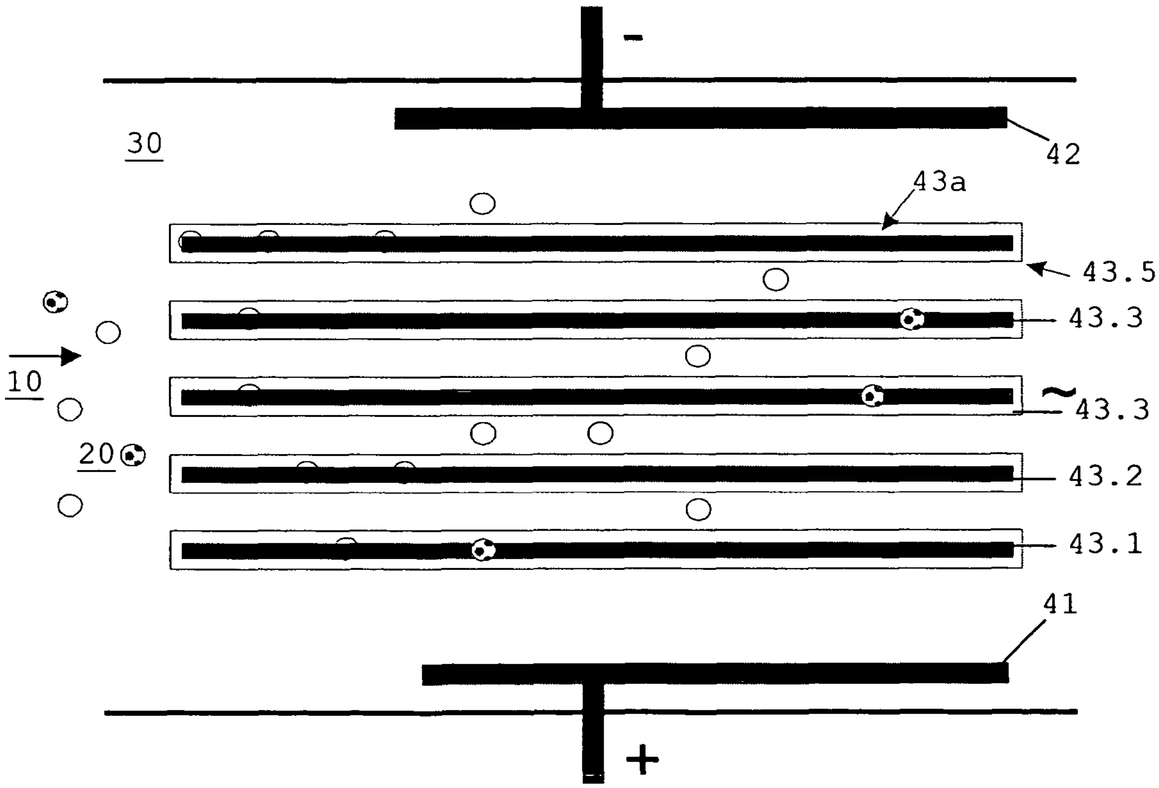

If several, optionally passivated electrodes 43.1 to 43.5 are provided for the dielectrophoresis, the design shown in FIG. 6 results. Channel 30 comprises electrodes 41, 42 for the electrophoresis arranged three-dimensionally on the side walls and comprises electrodes 43.1 to 43.5 on the bottom surface for the dielectrophoresis (electric feed lines not shown). Dielectrophoresis electrodes are located on the top surface (not shown) in the same number and arrangement as electrodes 43.1 to 43.5. Electrodes 43.1 to 43.5 are loaded with signals that are out-of-phase by 180° between adjacent electrodes (e.g., 43.1, 43.2) and are in-phase for superposed electrodes (e.g., 43.1 and the opposite electrode on the top surface). Particles 20 washed in with flow 10 comprise, e.g., two types of which one type is not addressed by electrophoresis. Particles 20 are first ordered dielectrophoretically (negative dielectrophoresis) in the intermediate area of the superposed electrodes (covered in the top view). The particles of the one type are deflected with passing the electrophoretic field only whereas the other type remains uninfluenced.

Figure 7:
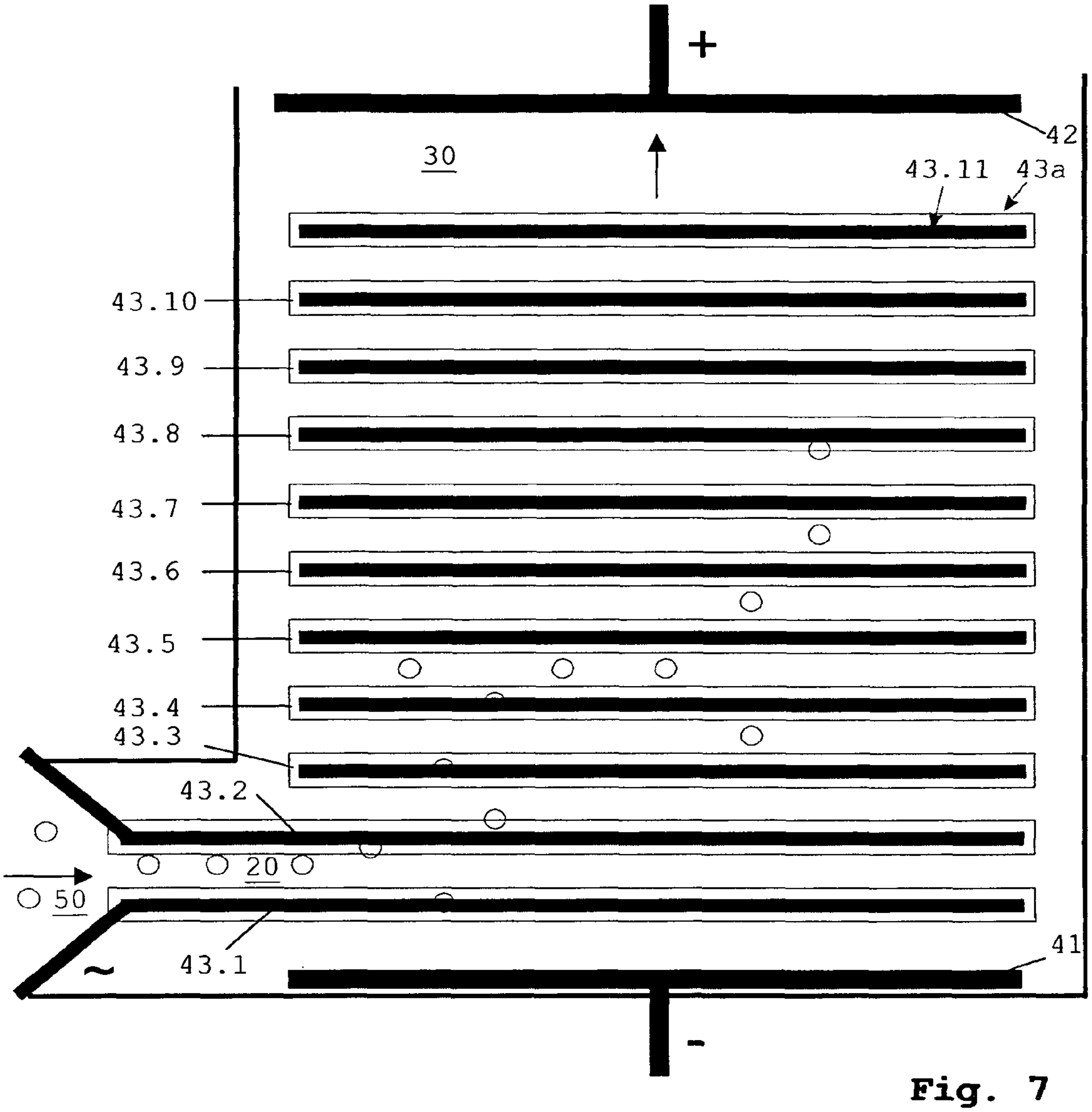

In the embodiment according to FIG. 7 many optionally passivated electrodes 43.1 to 43.11 for the dielectrophoresis are also arranged between electrodes 41, 42 for the electrophoresis. Dielectrophoresis electrodes are present on the top surface (not shown) in the same number and arrangement as electrodes 43.1 to 43.11. The first dielectrophoresis electrode pair 43.1, 43.2 is provided with a dielectric sequencing element 50 for increasing the sharpness of separation. In distinction to the above-described embodiments, in FIG. 7 the direct voltage electrophoretic field (direction of deflection) is aligned parallel to the direction of flow of liquid 10 (see arrow) through compartment 30.

During the control of the dielectrophoretic electrode array with 180° phase shift between adjacent and opposite electrodes or with 90° phase shift particles 20 are ordered between the electrodes (negative dielectrophoresis). The dielectrophoresis electrodes form a periodic, modulated potential (typically asymmetric) on which the electrophoretic potential between electrodes 41, 42 is superposed. The asymmetric modulation of the dielectrophoretic fields means that greater or lesser field strengths are alternately set between adjacent electrodes strips of array 43.1 to 43.11. The electrophoretic potential between electrodes 41, 42 is not maintained constant in time but rather switched periodically or randomly. This allows a highly sensitive separation to be realized in accordance with the principle of the so-called Brownian ratchet (or agitating ratchet, see H. Linke et al., "Physikalische Blatter", vol. 56, No. 5, 2000, pp. 45-47). In the Brownian ratchet the travel rate of particles due to Brownian movement is heavily dependent on the particle size. The separation takes place in different flow sections in the direction of flow in accordance with the different travel rates of the particles. This procedure has the special advantage that the separation can be controlled in a sensitive manner via several adjustable parameters by the superpositioning of the Brownian movement, the electrophoresis and the dielectrophoresis. This embodiment of the invention is especially suitable for the separation of molecules (e.g., sequence of DNA molecules or DNA fragments, that are all negatively charged in a physiological environment).

In a mixed population of differing charges (+/−) the entrance channel with sequencing element 50 should be located centrally relative to the array of the dielectrophoresis electrodes in order that objects with different charges are moved in electrophoretically different directions. In planar structures asymmetric potentials for positive dielectrophoresis can also be realized, e.g., by applying passivation layers that are asymmetric, that is, e.g., with different thicknesses relative to the longitudinal direction of the channel.

Figure 8:
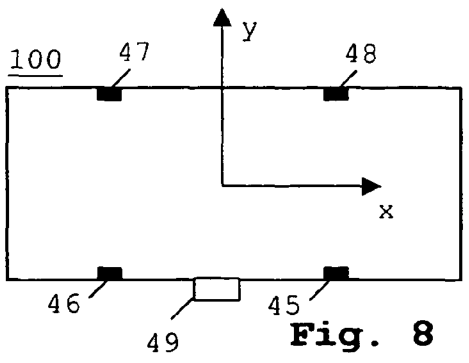
FIG. 8 shows a schematic cross-sectional view of an electrode arrangement for illustrating an embodiment of the invention in which several deflecting potentials are generated.

FIG. 8 illustrates, like FIG. 2, a cross sectional view of a fluidic microsystem 100 with four electrodes 45-48. A focusing potential is generated with these electrodes whose potential minimum is located in the channel middle. At the same time, analogously to FIG. 3, a first electrical potential acting in the x-direction for an electrophoretical field effect is generated and in addition a magnetic field gradient in the y-direction for forming a second, deflecting potential. The magnetic field gradient is formed with element 49 that generates a magnetic field and comprises, e.g., a permanent magnet that is isolated from the liquid and through which current flows. In distinction to the embodiment shown, the element generating a magnetic field can be arranged at a distance from the channel.

While the particles are moving in the z-direction through the channel they experience a deflection in both spatial directions x and y, whose strength is a function of the dielectrical and magnetic properties of the particles to be separated. This embodiment of the invention is used, e.g., to separate latex-encased, superparamagnetic particles in order to obtain fractions with a high monodispersability.

Figure 9:
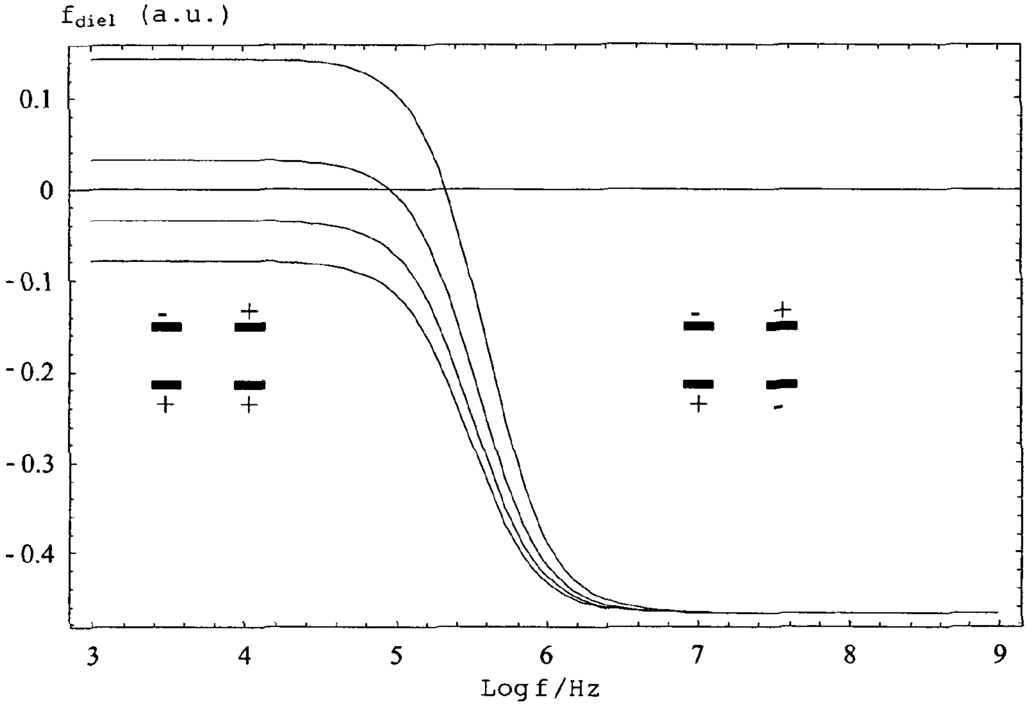
FIG. 9 shows a representation of curves for explaining the generation of a deflecting potential by the superposing of dielectrophoretic forces, FIGS. 10A, B show schematic illustrations of conventional microsystems with a dielectrophoretic (a) and an electrophoretic (B) separation.
Figure 10:
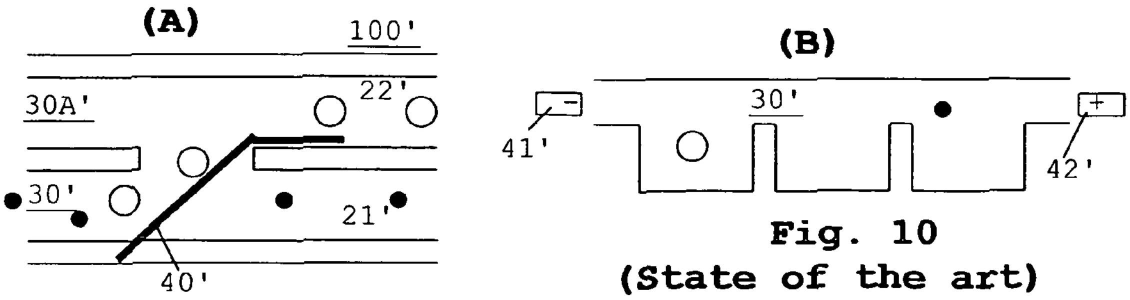

The representation of curves shown in FIG. 9 illustrates the dielectrophoretic force fdiel, standardized to the particular volume, that acts on a particle in the alternating field as a function of the frequency of the alternating field. The simulation results are relative to latex beads with diameters of 0.5 μm, 1 μm, 2 μm and 5 μm (curves from the top) with a conductivity of 0.7 mS/m and permittivity=3.5 in water. The symbolically illustrated electrodes are arranged in analogy with FIG. 1 and are loaded alternately or in a superposed manner with a signal containing frequency portions below 100 kHz and above 1 MHz. The low-frequency and higher-frequency signal portions are generated, e.g., with amplitudes that are the same in their temporal root mean square but with different phase relationships illustrated in the image inserts. The higher-frequency signal focuses the particles by negative dielectrophoresis toward the channel middle. In contrast thereto, the low-frequency signal acts as a function of the particle size by positive or negative dielectrophoresis that is superposed on the focusing action of the higher-frequency signal. The smaller particles are deflected upward to the left as a result, whereas the larger particles (e.g., 5 μm) collect on a diagonal line of the bottom right. Accordingly, particles with different sizes pass in different flow paths within the flow through the channel.

The features of the invention disclosed in the previous specification, the drawings and the claims can be significant individually as well as in combination for the realization of the invention in its various embodiments.

The invention claimed is:

1. A method for separating particles in a compartment of a fluidic microsystem, comprising the steps:

continuously moving through the compartment a liquid in which particles are suspended with a predetermined direction of flow, generating a deflecting potential wherein: (a) at least a part of the particles is moved relative to the liquid in a direction of deflection, and (b) the deflecting potential is formed by a direct voltage field under whose action the particles are drawn by electrophoresis to at least one of a plurality of lateral walls of the compartment, generating at least one focusing potential, so that at least a part of the particles is moved opposite to the direction of deflection relative to the liquid by dielectrophoresis under an effect of high-frequency electrical fields, and guiding particles with different electrical, magnetic or geometric properties into different flow areas in the liquid, to thereby separate the particles by combined exertion of the deflecting potential and the at least one focusing potential during the continuous moving of the liquid including the suspended particles.

2. The method according to claim 1, wherein the direction of deflection deviates from the direction of flow and comprises a component transverse to the direction of flow.

3. The method according to claim 2, wherein the direction of deflection runs perpendicularly to the direction of flow toward at least one of the plurality of lateral walls of the compartment, and the flow areas comprise flow paths corresponding to different potential minima formed for the particular particles by superposing of the deflecting and focusing potentials during passage through the compartment in a temporal average.

4. The method according to claim 1, wherein the particles comprise biological cells of which at least a part is lysed under action of the direct voltage field.

5. The method according to claim 3, wherein the liquid comprises a suspension of biological material containing biological cells and cell components and whereby a separation of the biological cells from the cell components takes place under action of a direct voltage field.

6. The method according to claim 1, wherein electrodes are arranged on walls of the compartment, said electrodes being loaded with electrical fields for generating the dielectrophoresis and the electrophoresis.

7. The method according to claim 1, wherein the deflecting and focusing potentials are generated alternating in time in at least one section of the compartment or geometrically alternating in different successive sections of the compartment.

8. The method according to claim 5, wherein the electrical fields comprise high-frequency alternating voltage components and direct voltage components generated simultaneously or alternately.

9. The method according to claim 6, wherein a plurality of focusing potentials is generated with an electrode array between two electrodes and wherein the particles are guided onto different flow paths in accordance with electrical or geometric properties of the particles.

10. The method according to claim 2, wherein the particles are guided onto at least two separate flow paths.

11. The method according to claim 10, wherein the at least two flow paths empty into other, separate compartments of the microsystem.

12. The method according to claim 11, wherein the at least two flow paths empty into separate compartments of the microsystem separated by compartment walls or electric barriers.

13. The method according to claim 1, wherein the direction of deflection runs parallel to the direction of flow and several focusing potentials are generated that are asymmetrically modulated in parallel with the direction of deflection and wherein the particles run through the deflecting potential at different speeds.

14. The method according to claim 1, wherein the particles flow in front of the electrodes on a dielectrophoretic or hydrodynamic sequencing element.

15. The method according to claim 1, wherein a pH gradient is generated in the channel.

16. The method according to claim 15, wherein the pH gradient is generated by electrical direct voltage fields provided for electrophoretic separation of the particles.

17. The method according to claim 1, wherein a detection of the particles takes place after the guiding of the particles onto the different flow paths.

18. The method according to claim 1, wherein the deflecting and the focusing potentials are formed by several superposed alternating voltages with different frequencies.

19. The method according to claim 1, wherein at least two deflecting notentials with different directions of deflection are generated.

20. A fluidic microsystem comprising:

at least one compartment, through which a liquid with particles is adapted to flow through in a predetermined direction of flow, first separating electrodes for generating a deflecting potential and for moving the particles by electrophoresis in a direction of deflection, and second separating electrodes for generating at least one focusing potential so that the particles are moved by dielectrophoresis opposite to the direction of deflection, and guiding particles with different electrical, magnetic or geometric properties into different flow areas in the liquid, to thereby separate the particles by combined exertion of the deflection potential and the least one focusing potential during the continuous moving of the liquid including the suspended particles.

21. The microsystem according to claim 20, wherein the direction of deflection deviates from the direction of flow.

22. The microsystem according to claim 20, wherein the first and the second separating electrodes are arranged separately in different, successive sections of the at least one compartment.

23. The microsystem according to claim 20, wherein the first and the second separating electrodes form a common deflection unit.

24. The microsystem according to claim 23, wherein the common deflection unit can be alternately controlled in time with alternating and direct voltages.

25. The microsystem according to claim 20, wherein an electrode array comprising electrode strips is arranged between the electrophoresis electrodes, said strips being individually controllable with high-frequency alternating voltages.

26. The microsystem according to claim 20, wherein the direction of deflection runs parallel to the direction of flow.

27. The microsystem according to claim 21, wherein the first electrodes are arranged on inner sides of walls of the compartment.

28. The microsystem according to claim 20, wherein the compartment empties into separate compartments of the microsystem.

29. The microsystem according to claim 28, wherein the compartments of the microsystem are separated by compartment walls or electrical barriers.

30. The microsystem according to claim 20, wherein a dielectrophoretic or hydrodynamic aligning element is arranged in front of the separating electrodes.

* * * * *